United States Patent [19]
Godek

[11] Patent Number: 6,026,924
[45] Date of Patent: Feb. 22, 2000

[54] STEERING GEAR

[75] Inventor: Daniel A. Godek, Royal Oak, Mich.

[73] Assignee: TRW Inc., Lyndhurst, Ohio

[21] Appl. No.: 08/798,354

[22] Filed: Feb. 10, 1997

[51] Int. Cl.[7] .................................................. B62D 5/04
[52] U.S. Cl. .................. 180/444; 74/388 PS; 280/90
[58] Field of Search ............................ 280/90, 89, 89.13, 280/94; 180/443, 444, 446; 74/388 PS

[56] References Cited

U.S. PATENT DOCUMENTS

| | | | |
|---|---|---|---|
| 3,627,346 | 12/1971 | Dorner et al. | 280/90 |
| 3,926,070 | 12/1975 | Busso | 280/90 |
| 4,415,054 | 11/1983 | Drutchas . | |
| 4,666,014 | 5/1987 | Carlson et al. . | |
| 4,735,271 | 4/1988 | Shimizu . | |
| 4,986,382 | 1/1991 | Harrison | 74/388 PS |
| 5,080,186 | 1/1992 | Elser et al. | 74/388 PS |
| 5,145,021 | 9/1992 | Nakamura et al. | 180/444 |
| 5,456,330 | 10/1995 | Kojima et al. . | |

FOREIGN PATENT DOCUMENTS 906648  9/1962  United Kingdom ..................... 280/90

*Primary Examiner*—Anne Marie Boehler
*Attorney, Agent, or Firm*—Tarolli, Sundheim, Covell, Tummino & Szabo L.L.P.

[57] ABSTRACT

An assembly for turning steerable wheels of a vehicle upon manual rotation of a steering wheel (12) includes a steering member (14) which is axially movable to effect turning movement of the steerable vehicle wheels. A housing surrounds at least a portion of the steering member (14). A ball nut drive (38) located within the housing is drivingly connected to a thread portion (26) of the steering member (14). An electric assist motor (36) located within the housing is drivingly connected to the ball nut drive (38). A fluid or lubricant (68) is located within the housing and damps movement of the steering member (14).

6 Claims, 2 Drawing Sheets

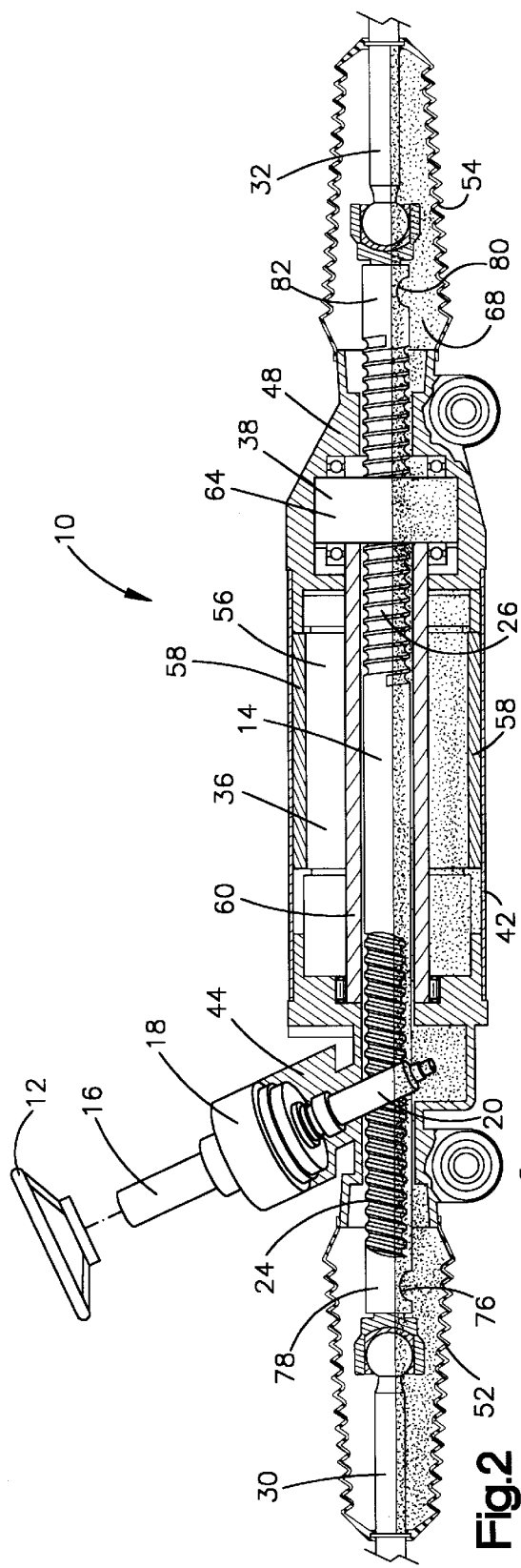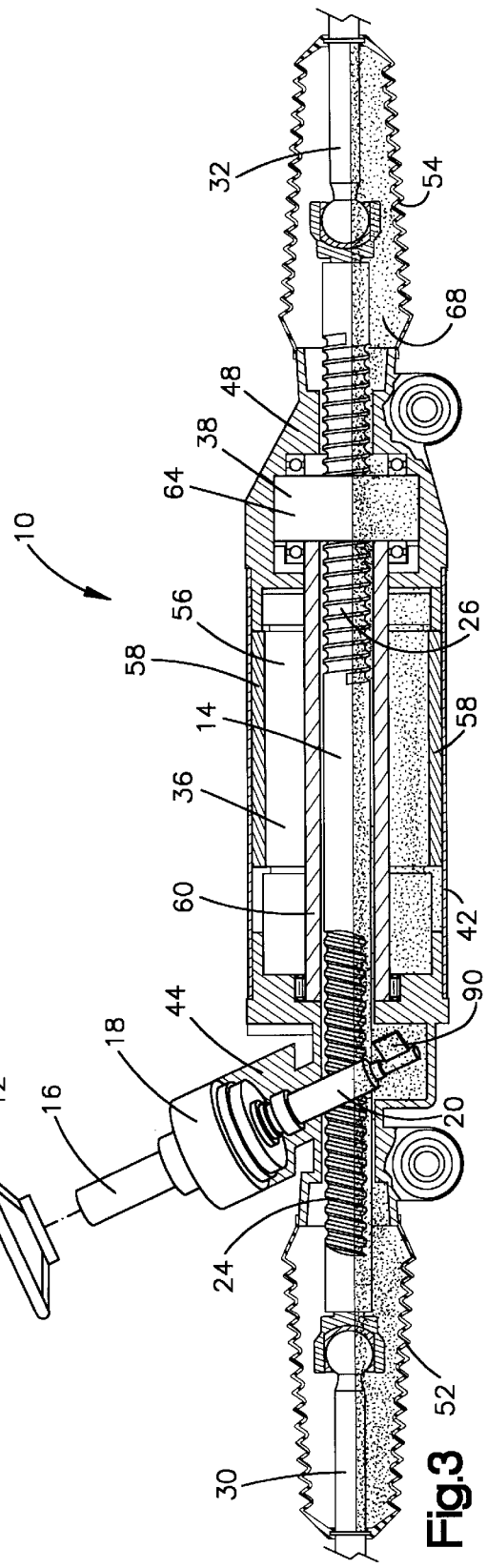

STEERING GEAR

BACKGROUND OF THE INVENTION

The present invention relates to a steering gear for turning steerable wheels of a vehicle upon rotation of a steering wheel. More specifically, the present invention relates to a steering gear having an electric assist motor.

Known steering gears include a steering member which is axially movable to effect turning movement of steerable vehicle wheels. An electric assist motor drives a mechanism, such as a ball nut which is drivingly connected to a thread portion of the steering member. The electric assist motor drives the ball nut in response to a torque applied to a steering wheel. As the electric assist motor drives the ball nut, the steering member moves axially in response to rotation of the ball nut to turn the vehicle wheels.

There is a relatively small amount of friction in a steering system having an electric assist motor. During a power failure, power to the electric assist motor is cut off. When the steering wheel is released by a vehicle operator after a steering maneuver and when power to the electric assist motor is cut off, the steering member may move past a straight ahead position due to the lack of friction in the steering gear. The steering member may then move to the other side of the straight ahead position and may continue to oscillate back and forth on opposite sides of the straight ahead position.

SUMMARY OF THE INVENTION

The present invention relates to a steering gear assembly for moving opposite tie rod ends to turn the steerable wheels of a vehicle upon manual rotation of a steering wheel. The assembly comprises a steering member having opposite ends connectable to the opposite tie rod ends. The steering member is axially movable to effect turning movement of the steerable vehicle wheels. A housing surrounds at least a portion of the steering member. An electric assist motor drive axially moves the steering member. A body of fluid or lubricant located within the housing damps axial movement of the steering member.

The present invention also relates to a steering gear for turning the steerable vehicle wheels of a vehicle upon manual rotation of a steering wheel. Upon rotation of the steering wheel a steering member is axially moved to effect turning movement of the steerable vehicle wheels. The steering member has thread means thereon. A housing surrounds at least a portion of the steering member. A ball nut drive means located within the housing is drivingly connected to the thread means of the steering member and is drivingly connected to an electric assist motor located within the housing. An electrically inert fluid or lubricant is located within the housing. Each of the motor, ball nut drive means, and the steering member are at least partially surrounded by the fluid or lubricant.

BRIEF DESCRIPTION OF THE DRAWING

The foregoing and other features of the present invention will become apparent to one skilled in the art to which the present invention relates upon reading the following description of the invention with reference to the accompanying drawing, wherein:

FIG. 2 is a plan view partially in section of a second embodiment of a power steering system in accordance with the present invention; and FIG. 3 is a plan view partially in section of a third embodiment of a power steering system in accordance with the present invention.

DESCRIPTION OF A PREFERRED EMBODIMENT

Figure 1:
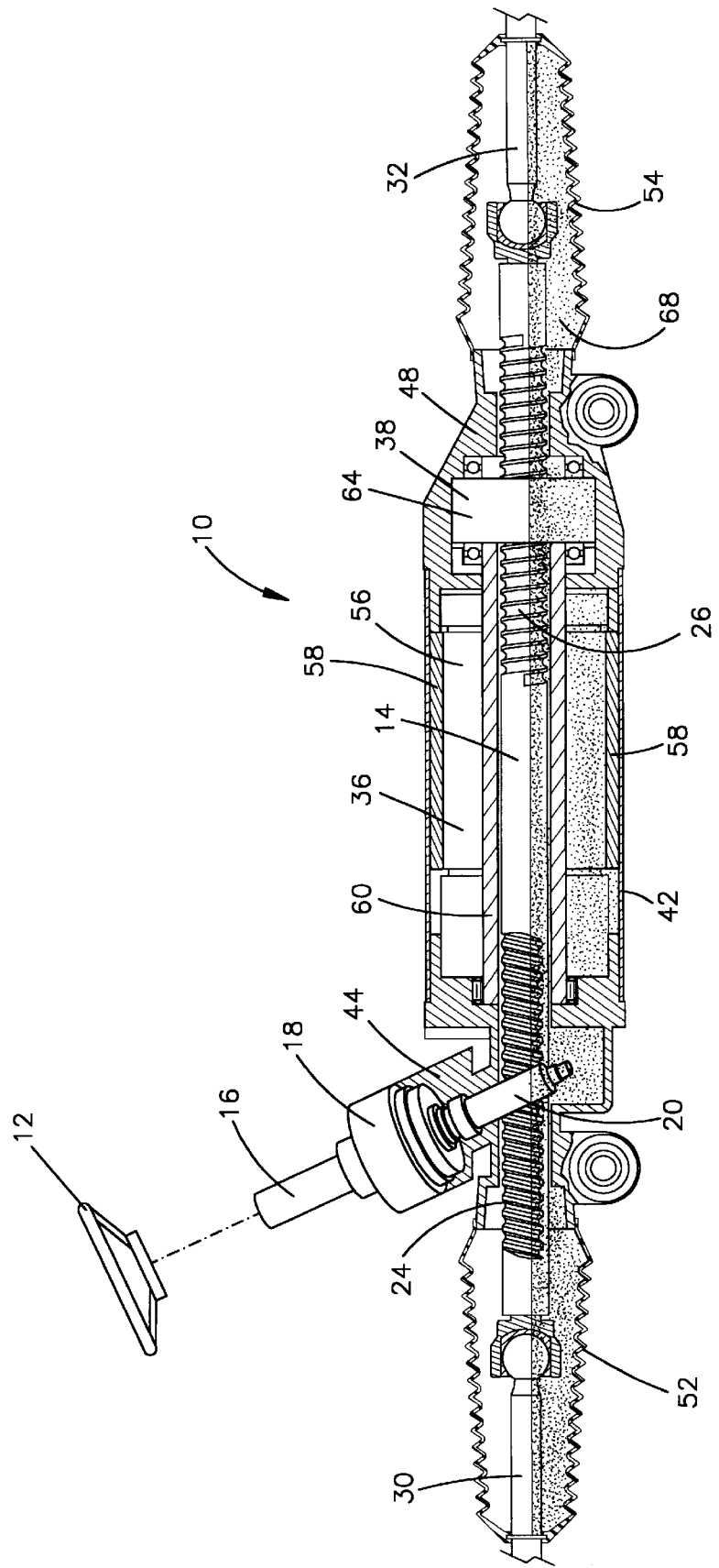
FIG. 1 is a plan view partially in section of a first embodiment of a power assist steering system in accordance with the present invention.

A power assist steering gear 10 (FIG. 1) includes a driver operated steering wheel 12 operatively connected to a steering member 14. The steering member 14 is in force transmitting engagement with steerable wheels (not shown) of a vehicle. Specifically, the vehicle steering wheel 12 is operatively connected to an input shaft 16 which extends into a pinion tower 18 and is mechanically coupled to a pinion gear 20, as is well known in the art.

The steering member 14 includes a first portion having rack teeth 24 disposed thereon and a second portion having an external thread convolution 26 disposed thereon axially spaced from the rack teeth 24. The pinion gear 20 includes gear teeth that meshingly engage with the rack teeth 24, as is well known in the art. The steering member 14 is operatively connected to steerable wheels of the vehicle through tie rods 30 and 32 connected at opposite ends of the steering member 14.

When steering torque is applied to the steering wheel 12, a torque sensor (not shown) actuates an electric assist motor 36. Power assist is provided by the electric assist motor 36 which is drivably connected to a ball nut assembly 38 which is in turn drivingly connected to the steering member 14. A detailed description of the use of an electric motor driven ball nut assembly to provide power assist steering is found in U.S. Pat. No. 4,666,014. A motor housing 42 partially surrounds the steering member 14 and is connected at one end to a pinion housing 44. The pinion housing 44 is part of the pinion tower 18. An outboard housing 48 is connected to the other end of the motor housing 42.

A boot 52 is connected to the tie rod 30 and the pinion housing 44. A boot 54 is connected to the tie rod 32 and the outboard housing 48. The boots 52 and 54 prevent environmental contaminants from entering the steering system.

For purposes of this invention any electric motor could be used. The invention is not limited to the type of motor or the type of drive connection of the motor to the steering member 14. For purposes of illustrating a schematic embodiment, the drawings show the electric power assist motor 36 located within the motor housing 42 and surrounding the steering member 14. The electric motor 36 may include an armature 56 surrounded by permanent magnets 58 secured to the interior of the motor housing 42 or alternatively may be a brushless D.C. motor.

A connection tube 60 is connected to and extends axially outward of the armature 56. The connection tube 60 is also connected to the ball nut drive 38. When the electric power assist motor 36 is energized, the armature 56, and the connection tube 60, rotate about the steering member 14 and the magnets 58 remain stationary in the housing 42. The ball nut drive assembly 38 drivingly engages the thread portion 26 of the steering member 14 to axially move the steering member.

The ball nut drive assembly 38 includes a generally cylindrical, rotatable nut member 64. The ball nut assembly 38 includes a plurality of balls which provide mechanical coupling between an interior thread portion of the main body portion 64 and the thread portion 26 of the steering member 14, as is well known in the art. As the motor 36 drives the connection tube 60 and thus, the nut 64 in rotation, the balls force the steering member 14 to move linearly. The ball nut drive assembly 38 thus, acts as a gear box which converts rotary motion of the electric assist motor 36 into linear motion of the steering member 14.

A body of an electrically inert fluid or lubricant 68 is located within the motor housing 42, the pinion housing 44, the outboard housing 48, and the boots 52 and 54. The body of fluid or lubricant extends continuously between the boots 52 and 54 and along the steering member 14. The fluid or lubricant 68 may be a synthetic lubricant. The fluid or lubricant partially surrounds each of the motor 36, the ball nut drive assembly 38, the steering member 14, and the tie rods 30 and 32. The fluid or lubricant 68 partially surrounds the rack portion 24 and the threaded portion 26 of the steering member 14. The fluid or lubricant is displaced axially by axial movement of parts of the steering system 10.

The fluid or lubricant 68 preferably has a relatively low viscosity and provides a damping characteristic in the steering system 10 offering better control. The damping occurs due to the inherent characteristics of the fluid or lubricant 68 which is displaced by the moving parts of the steering system 10. The damping characteristic of the fluid or lubricant 68 minimizes the possibility of the steering member 14 moving past a straight ahead position when the steering wheel 12 is released after a steering maneuver and when power to the motor 36 is cut off. Preferably, the fluid or lubricant 68 is a lubricant known as Vistone 801 manufactured by Exxon Chemical Company.

Furthermore, the fluid or lubricant 68 provides vibration damping to reduce noise produced by the steering assembly 10. Also, the fluid or lubricant 68 absorbs and disperses a certain percentage of contamination which may enter the steering system 10. Also, leaking fluid or lubricant 68 will indicate seal failure along the steering member 14. It is clear that the fluid or lubricant could be contained in a portion of the steering system and provide damping if a moving part of the steering system at least partially engages the fluid or lubricant, such as a "paddle wheel" on the ball nut.

In a second embodiment of the present invention, shown in FIG. 2, the steering member 14 is hollow. The steering member 14 has an opening 76 in a first end portion 78 connected to the tie rod 30. The steering member 14 has an opening 80 in a second end portion 82 connected to the tie rod 32. The openings 76 and 80 permit the fluid or lubricant 68 to flow through the hollow steering member 14 to provide the damping characteristic in the steering system 10.

In a third embodiment of the present invention, shown in FIG. 3, a paddle 90 connected to the pinion 20 extends radially outward into the fluid or lubricant 68. The paddle 90 must move through the fluid or lubricant 68 during rotation of the pinion 20 and provides damping in the steering system 10. The paddle 90 may be connected to any member that moves relative to the housing, such as the steering member 14. If the paddle 90 is connected to the steering member 14, the paddle moves through the fluid or lubricant 68 during axial movement of the steering member to provide damping.

Although the present invention is shown as having the openings 76 and 80 in the steering member 14 or the paddle 90 connected to a member that moves relative to the housing, it is contemplated that the steering system could include the openings in the steering member along with the paddle.

From the above description of the invention, those skilled in the art will perceive improvements, changes and modifications. Such improvements, changes and modifications within the skill of the art are intended to be covered by the appended claims.

Having described the invention, the following is claimed:

1. An assembly for moving opposite tie rod ends to turn the steerable wheels of a vehicle upon manual rotation of a steering wheel, said assembly comprising:

a steering member having opposite ends connectable to said opposite tie rod ends, said steering member being axially movable to effect turning movement of the steerable vehicle wheels;

a housing surrounding at least a portion of said steering member;

an electric assist motor drive for axially moving said steering member;

a body of fluid or lubricant located within said housing for damping axial movement of said steering member; and a pinion located within said housing and rotatable in response to rotation of the steering wheel, said pinion being engageable with a rack portion of said steering member, said body of fluid or lubricant partially surrounding said pinion, said rack portion of said steering member, and said electric assist motor drive.

2. An assembly as set forth in claim 1 further including a movable member extending from one of said steering member, said pinion, and said electric assist motor drive and located within said housing, said movable member moving in response to rotation of the steering wheel, said movable member being at least partially surrounded by said lubricant.

3. An assembly for moving opposite tie rod ends to turn the steerable wheels of a vehicle upon manual rotation of a steering wheel, said assembly comprising:

a steering member having opposite ends connectable to said opposite tie rod ends, said steering member being axially movable to effect turning movement of the steerable vehicle wheels;

a housing surrounding at least a portion of said steering member;

an electric assist motor drive for axially moving said steering member;

a body of fluid or lubricant located within said housing for damping axial movement of said steering member; and a pair of boots connected to opposite ends of said housing into which said opposite ends of said steering member and said opposite tie rod ends extend, said fluid or lubricant being located within said boots and surrounding at least a portion of said steering member located within said boots and said opposite tie rod ends.

4. An assembly for moving opposite tie rod ends to turn the steerable wheels of a vehicle upon manual rotation of a steering wheel, said assembly comprising:

a steering member having opposite ends connectable to said opposite tie rod ends, said steering member being axially movable to effect turning movement of the steerable vehicle wheels;

a housing surrounding at least a portion of said steering member;

an electric assist motor drive for axially moving said steering member;

a body of fluid or lubricant located within said housing for damping axial movement of said steering member; and said steering member being hollow and having openings located adjacent opposite end portions of said steering member, said fluid or lubricant flowing through said openings and an interior of said steering member as said steering member moves relative to said housing.

5. An assembly for turning steerable wheels of a vehicle upon manual rotation of a steering wheel, said assembly comprising:

a steering member which is axially movable to effect turning movement of the steerable vehicle wheels, said steering member having thread means thereon;

a housing surrounding at least a portion of said steering member;

an electric assist motor located within said housing;

a ball-nut drive means located within said housing for axially moving said steering member, said ball-nut drive means being drivingly connected to said thread means of said steering member and drivingly connected to said electric assist motor;

a fluid or lubricant located within said housing, each of said motor, said ball-nut drive means, and said steering member being at least partially surrounded by said fluid or lubricant;

a pair of boots connected to opposite ends of said housing through which said steering member extends, said fluid or lubricant being located within said boots and surrounding at least a portion of said steering member located within said boots; and a pinion located within said housing and rotatable in response to rotation of the steering wheel, said pinion being engageable with rack a portion of said steering member, said fluid or lubricant partially surrounding said pinion and said rack portion of said steering member, said fluid or lubricant extending continuously from one end of said steering member to the other end of said steering member.

6. An assembly for turning steerable wheels of a vehicle upon manual rotation of a steering wheel, said assembly comprising:

a steering member which is axially movable to effect turning movement of the steerable vehicle wheels, said steering member having thread means thereon;

a housing surrounding at least a portion of said steering member;

an electric assist motor located within said housing;

a ball-nut drive means located within said housing for axially moving said steering member, said ball-nut drive means being drivingly connected to said thread means of said steering member and drivingly connected to said electric assist motor;

a fluid or lubricant located within said housing, each of said motor, said ball-nut drive means, and said steering member being at least partially surrounded by said fluid or lubricant; and said steering member being hollow and having openings located adjacent opposite end portions of said steering member, said fluid or lubricant flowing through said openings and an interior of said steering member as said steering member moves relative to said housing.

* * * * *